Figure 1:
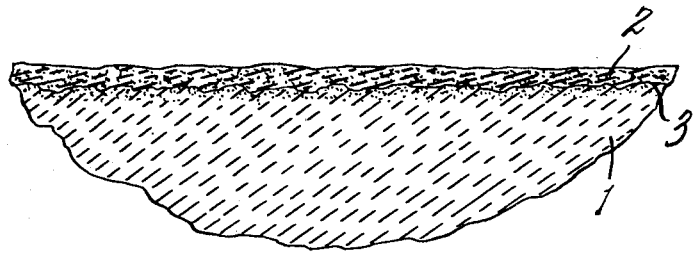

Dec. 19, 1950     H. L. WHITMAN     2,534,327

VITRIFYING REFRACTORY COMPOSITION AND PRODUCT

Filed Sept. 6, 1946

INVENTOR.
Henry L. Whitman
BY
Attorney.

Patented Dec. 19, 1950

2,534,327

UNITED STATES PATENT OFFICE 2,534,327

VITRIFYING REFRACTORY COMPOSITION AND PRODUCT

Henry L. Whitman, Los Angeles, Calif., assignor, by decree of court, to Katherine L. Whitman Application September 6, 1946, Serial No. 695,221

7 Claims. (Cl. 106—49)

This invention relates to improvements in vitrifying refractory composition and product.

The main objects of the invention are:

First, to provide an improved vitrifying composition adapted to be readily applied as a coating to furnace and fire box bricks and to crucibles of graphite, fire clay and silicon carbide and to other objects of refractory material, and when so applied adapted to be converted by heat into a vitrified refractory coating, which is very hard and resistant to very high temperatures.

Second, to provide a composition of the above type which contains silicate ingredients in excess of basic or neutral ingredients and which is adapted to be converted by heat into a vitrified refractory, semi-glazed acid-type coating for refractory materials, which resists heat and the destructive action of flames, gases and acids and which protects the walls to which it is applied against spauling, cracking and melting to thereby greatly prolong the life of such walls.

Third, to provide a composition of the above type which may be economically applied as a coating, and in which a relatively small amount covers a substantial area.

Fourth, to provide a refractory vitrified crystalline acid-type product which is very hard, resistant to very high temperatures, a good reflector of heat and highly impervious to gases and acids.

Further objects relating to details and economies of the invention will appear from the description to follow. The invention is defined in the claims.

Figure 2:
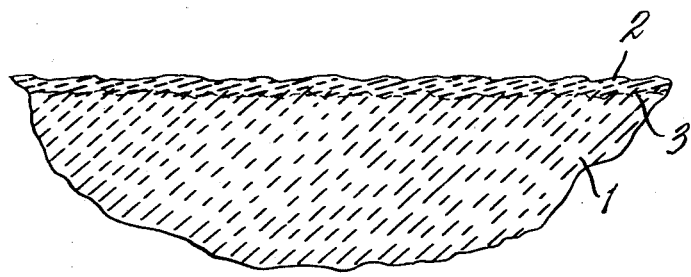

An embodiment of the invention is illustrated in the drawing in which:

Fig. 1 is a fragmentary view in section of a wall of a furnace, crucible or other article of refractory material, having a coating of vitrifying ingredients applied thereto, the ingredients being shown before vitrification of the same to the wall and, Fig. 2 is a view similar to that of Fig. 1 illustrating the wall after vitrification of the coating thereto.

Referring to Fig. 1 of the drawing, 1 designates the wall of a furnace, fire box, crucible or other article of refractory material, the wall having applied thereto a coating 2 of vitrifying ingredients, hereinafter named and described in detail. These ingredients are mixed in powdered form with water to the proper consistency, preferably to that of molasses, and applied to the wall with a spray or brush, the wall being cool or only slightly warm at the time of application, otherwise blisters will form. After applying the coat it is thoroughly dried in air, sunlight, a heating oven or a torch, after which the dried coating is exposed to a temperature of 1900° F. or over for an hour or until thoroughly vitrified. If desired, the vitrification can take place during the regular melting operation of a furnace or crucible. By applying a second coating after the first coating has been thoroughly vitrified, the best results are obtained, as some of the first coating is absorbed by the raw bricks into the cracks, holes and pores thereof, as shown at 3 in Fig. 1. The second coat after vitrification thereof completely seals all weak spots and forms a hard semi-glazed surface that resists heat and the destructive action from flames, gases and acids. Fig. 2 illustrates the absorbed portion 3 of the coating 2, vitrified into the body of the wall 1. This provides a very strong bonding connection between the wall and the coating after vitrification of the coating. The depth of the vitrified coating beneath the surface of the wall will vary according to the consistency of the coating and the porosity of the wall.

The coating 2 applied to the wall 1 as above described, comprises the following ingredients in percentages by weight as indicated:

|  | Minimum— Maximum |
|---|---|
| Zirconium silicate | 50% to 60% |
| Clay | 10% to 20% |
| Asbestos | 7% to 15% |
| Aluminum Oxide | 4% to 15% |
| Litharge | 2% to 5% |
| Magnesium oxide | 3% to 10% |
| Soda ash | 2% to 5% |
| Salt | 2% to 8% |
| Mica | 5% to 15% |
| Sodium silicate | 1% to 5% |

The following is a more detailed description of some of the above ingredients which vary in analysis according to the purity and source of supply:

Zirconium silicate—granular, chemical composition $ZrSiO_4$

Clay—kaolin or china clay

Asbestos—tremolite (amphibole) chemical composition $CaMg_3Si_4O_{12}$

Aluminum oxide—chemical composition $Al_2O_3$

Magnesium oxide—calcined magnesite

Salt—chemical composition NaCl

Mica—muscovite, chemical composition $$H_2KAl_3(SiO_4)_3$$

The product resulting from vitrification of the coating 2 containing the above ingredients is a silicate material, acid-type in reaction having silicate elements in excess of basic or neutral elements. During vitrification under fire at temperatures of 2090° to 2500° F., the combination of the zirconium silicate, alumites and silicas, asbestos and fire clay together with the litharge and soda ash, forms by precipitation a zirconium crystalline substance having a hardness very close to that of diamond, equal to approximately 7½ to 8 on Mohs scale. The zirconium compound being already in crystalline form is imbedded in this precipitated corundum-like formation of the other elements, making the whole a crystalline substance.

The remaining ingredients of the coating 2, comprising sodium chloride, sodium silicate and mica, perform the function more of a binder to prevent the other ingredients from drawing away from the wall 1 during the vitrification and the reaction resulting in the precipitated product. After the crystalline coating 2 is actually formed and vitrified onto and into the wall 1 and cooled, no further precipitation takes place. To refuse the now finished crystalline coating requires temperatures of 3750° to 3800° F. This results in a great saving in fire-brick and other refractory walls exposed to such high temperatures.

Also the semi-glazed crystalline surface resulting from the vitrification of the coating 2 as above described, constitutes an excellent reflector of heat as tests have proven that this surface reflects heat to such an extent that the brick furnace wall on the side thereof opposite from the coating remains cool during a heating operation. Such reflection of heat results in quicker heat-up time for a furnace, quicker melting of the metals and a saving in fuel. The vitrified coating will withstand long periods of reheating and is impervious to fluxes, gases and acids common to melting furnaces and fire boxes, so destructive to the brick.

The vitrification of the ingredients of the coating 2 and the precipitation of the corundum-like substance having imbedded therein crystals of a zirconium compound, is not dependent upon the material of the wall to which the coating is applied as the ingredients go through the same process of vitrification and precipitation on flint-brick, silica brick, magnesite brick, set-up clays, dolomites silicon carbide, etc. The only requirement is that the material to be coated be able to withstand the proper vitrifying temperatures. If the coating is applied to materials that are unable to withstand the proper vitrifying temperatures they melt down from under the vitrified coating.

The vitrified coating is adapted for many uses but being of an acid-type is particularly adapted for use on non-basic reverberatory furnaces used in making acid steels, on single or double-burner roll-over oil and gas fired furnaces used in melting non-basic metals and alloys and on oil distillate and gas fired furnaces and crucibles used in melting brass, bronze and other non-ferrous metals and alloys, except aluminum and magnesium.

The use of the ingredients is economical as a relatively small amount covers a substantial area to be coated, one pound, when properly applied, covering from 6 to 8 square feet of surface.

The product of the invention is characterized by its resistance to temperatures up to approximately 4000° F., its hardness close to that of diamond, its imperviousness to gases and acids common to furnaces and crucibles, its property of reflecting heat to prevent the escape thereof through furnace and crucible walls, the economy in the use thereof, and its property of being acid-type in reaction.

I have illustrated and described my improved vitrifying composition and product in embodiments thereof which I consider practical. I have not attempted to illustrate and describe other embodiments or adaptations as it is believed the disclosure will enable those skilled in the art to embody or adapt my improvements as may be desired.

Having thus described my invention, what I claim as new and desire to secure by Letters Patent, is:

1. A vitrifying composition adapted to produce a refractory vitrified crystalline acid-type coating for refractory materials, comprising by weight the following ingredients: zirconium silicate 50% to 60%, clay 10% to 20%, asbestos 7% to 15%, aluminum oxide 4% to 15%, litharge 2% to 5%, magnesium oxide 3% to 10%, soda ash 2% to 5%, sodium chloride 2% to 8%, mica 5% to 15% and sodium silicate 1% to 5%, said last three named ingredients facilitating a binding connection of the coating to the refractory material.

2. A vitrifying composition adapted to produce a refractory vitrified crystalline acid-type coating for refractory materials, comprising by weight the following ingredients: zirconium silicate 50% to 60%, clay 10% to 20%, asbestos 7% to 15%, aluminum oxide 4% to 15%, litharge 2% to 5%, magnesium oxide 3% to 10%, a carbonate 2% to 5% selected from the group consisting of sodium carbonate and potassium carbonate, a chloride 2% to 8% selected from the group consisting of sodium chloride and potassium chloride, mica 5% to 15% and a silicate 1% to 5% selected from the group consisting of sodium silicate and potassium silicate, the last three named ingredients facilitating a binding connection of the coating to the refractory material.

3. A refractory product comprising a porous body portion of refractory material and a refractory vitrified crystalline acid-type coating vitrified in the pores of said body portion and on the surface thereof, said refractory material being selected from the group consisting of fire clay, graphite and silicon carbide, said coating being produced by vitrifying to said body portion the following ingredients: zirconium silicate 50% to 60%, clay 10% to 20%, asbestos 7% to 15%, aluminum oxide 4% to 15%, litharge 2% to 5%, magnesium oxide 3% to 10%, soda ash 2% to 5%, sodium chloride 2% to 8%, mica 5% to 15% and sodium silicate 1% to 5%, the above percentages all being by weight, the sodium chloride, mica and sodium silicate acting as a binder between the body portion and the coating to prevent the coating from drawing away from the porous body portion during the vitrification of the coating in the pores of the body portion and on the surface thereof.

4. A refractory product comprising a porous body portion of refractory material and a refractory vitrified, crystalline acid-type coating vitrified in the pores of said body portion and on the surface thereof, said refractory material being selected from the group consisting of fire clay, graphite and silicon carbide, said coating being produced by vitrifying to said body portion the following ingredients: zirconium silicate 50% to 60%, clay 10% to 20%, asbestos 7% to 15%, aluminum oxide 4% to 15%, litharge 2% to 5%, magnesium oxide 3% to 10%, a carbonate 2% to 5% selected from the group consisting of sodium carbonate and potassium carbonate, a chloride 2% to 8% selected from the group consisting of sodium chloride and potassium chloride, mica 5% to 15% and a silicate 1% to 5% selected from the group consisting of sodium silicate and potassium silicate, the above percentages all being by weight, the mica, the chloride selected from the group consisting of sodium chloride and potassium chloride, and the silicate selected from the group consisting of sodium silicate and potassium silicate, acting as a binder to prevent the coating from drawing away the porous body portion during the vitrification of the coating in the pores of the body portion and on the surface thereof.

5. A refractory vitrified crystalline product, produced by vitrifying the following ingredients: zirconium silicate 50% to 60%, clay 10% to 20%, asbestos 7% to 15%, aluminum oxide 4% to 15%, litharge 2% to 5%, magnesium oxide 3% to 10%, soda ash 2% to 5%, sodium chloride 2% to 8%, mica 5% to 15% and sodium silicate 1% to 5%, the above percentages all being by weight.

6. A refractory vitrified crystalline product produced by vitrifying the following ingredients: zirconium silicate 50% to 60%, clay 10% to 20%, asbestos 7% to 15%, aluminum oxide 4% to 15%, litharge 2% to 5%, magnesium oxide 3% to 10%, a carbonate 2% to 5% selected from the group consisting of sodium carbonate and potassium carbonate, a chloride 2% to 8% selected from the group consisting of sodium chloride and potassium chloride, mica 5% to 15% and a silicate 1% to 5% selected from the group consisting of sodium silicate and potassium silicate, the above percentages all being by weight, said ingredients being vitrified at approximately 2090° F. and above.

7. A refractory vitrified crystalline product produced by vitrifying the following ingredients: zirconium silicate 50% to 60%, clay 10% to 20%, asbestos 7% to 15%, aluminum oxide 4% to 15%, litharge 2% to 5%, magnesium oxide 3% to 10%, a carbonate 2% to 5% selected from the group consisting of sodium carbonate and potassium carbonate, a chloride 2% to 8% selected from the group consisting of sodium chloride and potassium chloride, mica 5% to 15% and a silicate 1% to 5% selected from the group consisting of sodium silicate and potassium silicate, the above percentages all being by weight.

HENRY L. WHITMAN.

REFERENCES CITED

The following references are of record in the file of this patent:

UNITED STATES PATENTS

| Number | Name | Date |
| --- | --- | --- |
| 2,389,386 | Russell | Nov. 20, 1945 |